United States Patent [19]

Foreman et al.

[11] Patent Number: 4,928,286

[45] Date of Patent: May 22, 1990

[54] HYPERSONIC GASDYNAMIC LASER SYSTEM

[75] Inventors: Kenneth M. Foreman, North Bellmore; Algirdas Maciulaitis, Islip, both of N.Y.

[73] Assignee: Grumman Corporation, Bethpage, N.Y.

[21] Appl. No.: 222,143

[22] Filed: Jul. 21, 1988

[51] Int. Cl.$^5$ ............................................. H01S 3/09
[52] U.S. Cl. ...................................... 372/90; 372/58; 372/701
[58] Field of Search ...................... 372/58, 59, 89, 90, 372/701

[56] References Cited

U.S. PATENT DOCUMENTS

| | | | |
|---|---|---|---|
| 4,237,429 | 12/1980 | Hook et al. | 372/89 |
| 4,325,687 | 3/1983 | Hook et al. | 372/89 |
| 4,713,823 | 12/1987 | Smith | 372/90 |

*Primary Examiner*—Leon Scott, Jr.
*Attorney, Agent, or Firm*—Scully, Scott, Murphy & Presser

[57] ABSTRACT

A visible, or near to mid infra-red, hypersonic gasdynamic laser system incorporated in a hypersonic vehicle which provides high enthalpy ram air for thermodynamic excitation of the laser gases. The hypersonic vehicle defines therein a laser cavity, and ram air directed therethrough supports gasdynamic lasing operations at wavelengths less than 10.6 $\mu$ meters. An optical train collects the laser radiation from the laser cavity and directs it as a substantially collimated laser beam to an output aperture defined by an opening in the hypersonic aircraft too allow the laser beam to be directed against a target. The present invention is particularly applicable to a hypersonic vehicle powered by a supersonic combustion ramjet engine. Electrical energy is also produced on-board the vehicle, using ram air, or ram air plus fuel combustion, as the power source and an electrical turbogenerator (or another equivalent electrical generator) connected to a supersonic turbine. Electrical energy from the electrical generator is supplied to a plurality of excitation electrodes positioned along the laser cavity walls of the laser cavity, to provide an electric field for electrical excitation of the lasing gases flowing through the laser cavity. A laser frequency agility control circuit is coupled between the electrical generator and the excitation electrodes, for controlling the electrical power and voltage supplied to the electrodes and the electric field generated thereby. This in turn controls the energy of the electrons introduced into the laser cavity, and thereby the wavelengths of laser radiation produced therein. Another significant feature of the subject invention is the provision of gas additive injection nozzles positioned near the entrance to the laser cavity to inject a lasing influencing gas, such as CO, NO, HCl or CS, into the airflow through the laser cavity, to influence lasing operation in the laser cavity.

16 Claims, 7 Drawing Sheets

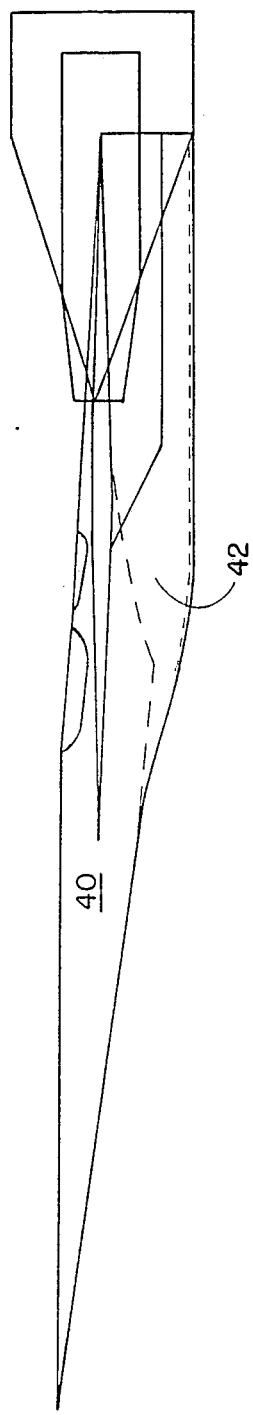
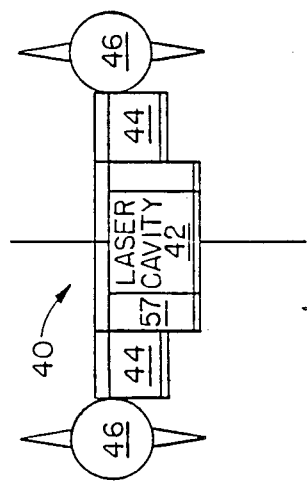
FIG. 3
FIG. 4

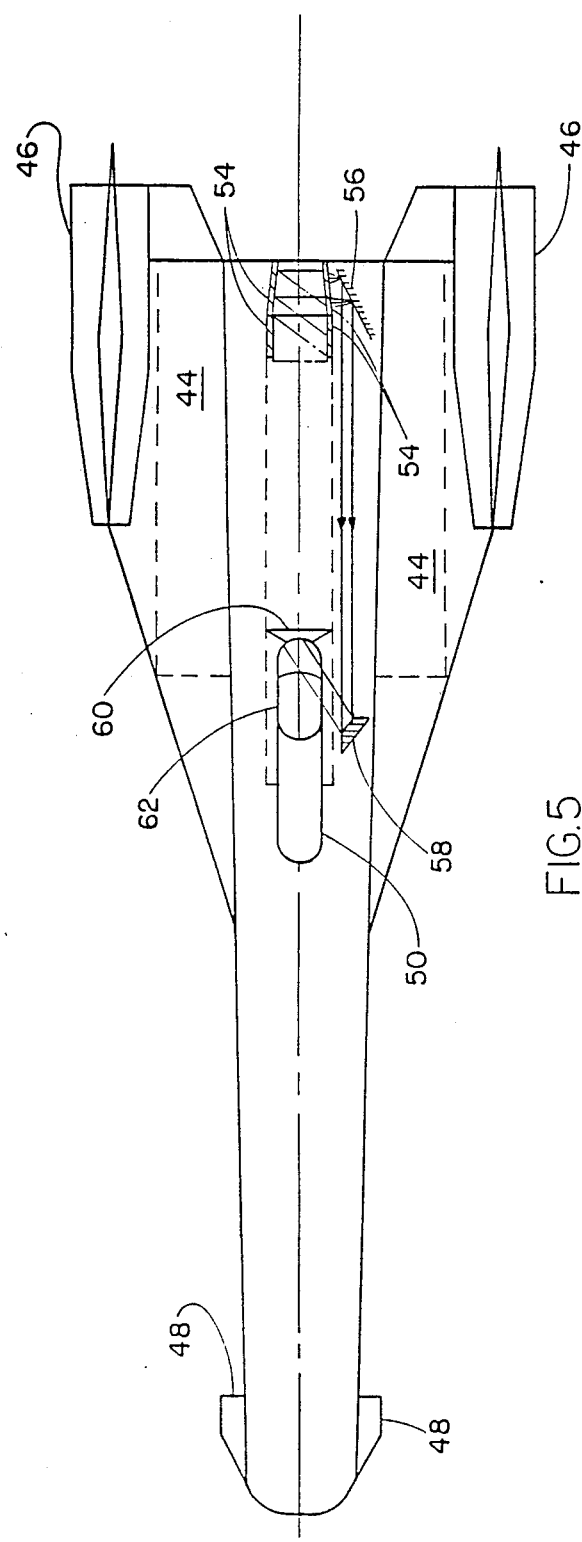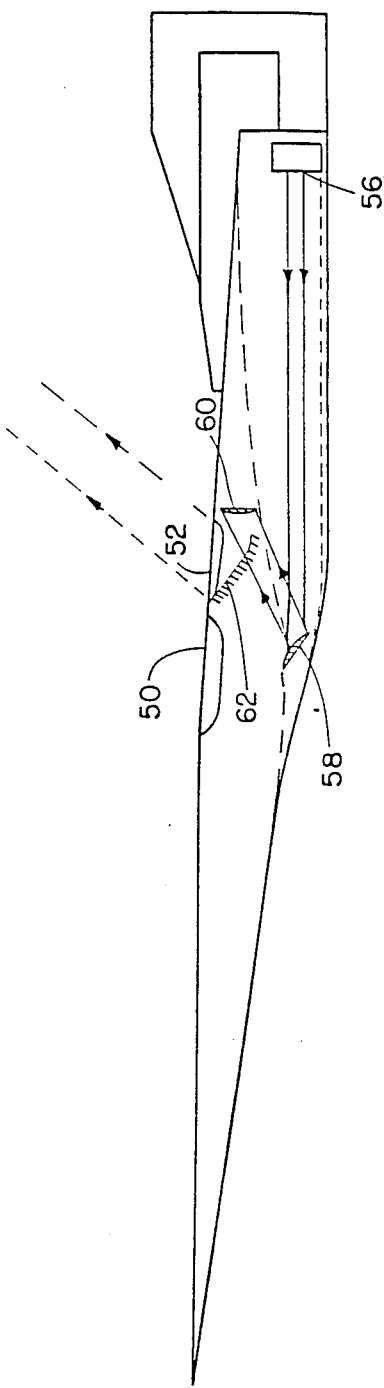

HYPERSONIC GASDYNAMIC LASER SYSTEM

BACKGROUND OF THE INVENTION

1. Field of the Invention

The present invention relates generally to a gasdynamic laser system for a hypersonic vehicle which operates at wavelengths shorter than $10.6\mu$ meters, down to wavelengths of less than $1\mu$ meter.

More particularly, the subject invention pertains to a gasdynamic laser system for a hypersonic vehicle as described wherein high enthalpy ram air provides an energy source for thermodynamic excitation of the laser gases, and also, when required, drives an electrical generator for electronic excitation of the lasing species.

2. Discussion of the Prior Art

In the late nineteen seventies, the Grumman Corporate Research Center, in cooperation with the NASA Langley Research Center, conceptualized an Advanced Flow Laser (AFL) and a Mixing Advanced Flow Laser (MAFL) for fleet defense against air-launched missiles and other missions. In both concepts, a high energy $CO_2$ laser is incorporated in a hypersonic (i.e., flight speeds greater than five times the local speed of sound), high altitude (i.e., greater than 35,000 ft. altitude) vehicle. During operation, energy from the high enthalpy ram air produces excited states in the $N_2$ molecules which are transferred by resonance to unstable, excited states of $CO_2$ constituents in the gas flowing through the lasing cavity. Carbon and water are required to be added to the lasing gas mixture, which flows through an appropriate expansion channel to produce and maintain the population inversion resulting in a 10.6 $\mu$m output ($CO_2$ laser). Because the laser beam intensity on target is inversely proportional to the square of the wavelength, the $CO_2$ laser is unsuited for missions where extremely long laser beam range is required. Moreover, this technology and approach could not be utilized below the 10.6 $\mu$m wavelength, which results in severe limitations on the extent of its practical usefulness.

SUMMARY OF THE INVENTION

Accordingly, it is a primary object of the present invention to provide a gasdynamic laser system for a hypersonic vehicle which operates in the visible or near-to mid-infrared portion of the spectrum at wavelengths shorter than $10.6\mu$ meter down to wavelengths of approximately $1\mu$ meter or less.

A further object of the subject invention is the provision of a gasdynamic laser system for a hypersonic vehicle wherein high enthalpy ram air provides an energy source for thermodynamic excitation of the laser gases, as well, when required, as to drive an electrical generator for electronic excitation of the lasing species.

The present invention provides a hypersonic gasdynamic laser system which overcomes the aforementioned constraints of the prior art by providing a new concept for lasing at wavelengths as much as an order of magnitude shorter than the 10.6 $\mu$m wavelength radiation generated by the $CO_2$ laser approach of the prior art. One advantage of the hypersonic gasdynamic laser described herein over the earlier conceived AFL and MAFL types arises from the removal of the constraint limiting the lasing to $CO_2$ at the relatively long wavelength of 10.6 $\mu$m. For example, a ten-fold reduction in wavelength will result in a hundred-fold intensity increase (over a 10.6 $\mu$m laser) on the target, if the product of the laser exit beam power and the square of the exit mirror diameter is maintained constant. A further advantage accrues in situations where the weight of the optical train and not the on-target intensity is the prime design consideration. The dimensions of the optics generally diminish with shorter wavelengths, thus tending to result in an overall system that is smaller and lighter weight.

Electronic excitations of atomic oxygen, nitrogen, or hydrogen can produce laser radiation at approximately 0.85 $\mu$m, 0.94–1.46 $\mu$m, or 1.88 $\mu$m, respectively in a hypersonic airbreathing propulsion system or a special lasing duct. Electronic excitation is also required in some diatomic molecule (e.g. CO) lasers. Since the amounts of electricity required are large, carrying the electrical energy in stored form (batteries, capacitors, inductors, etc.) is not practical just from weight considerations alone. In the hypersonic gasdynamic laser invention described herein, the electrical energy is produced on-board the vehicle, using ram air, or ram air plus fuel combustion, as the power source and an electrical turbogenerator (or another equivalent electrical generator) connected to a supersonic turbine. Preliminary estimates of available shaft power to the electrical generator are 2.5 megawatts per square foot of air duct frontal cross-section at Mach 7 and 30 km altitude.

In accordance with a preferred embodiment, the present invention provides a visible, or near to mid infra-red, hypersonic gasdynamic laser system incorporated in a hypersonic vehicle which provides high enthalpy ram air for thermodynamic excitation of the laser gases. The hypersonic vehicle defines therein a laser cavity having an inlet formed by an opening in the hypersonic vehicle, such that ram air directed through the laser cavity opening supports gasdynamic lasing operations at wavelengths less than $10.6\mu$ meters. An optical train collects the laser radiation from the laser cavity and directs it as a substantially collimated laser beam to an output aperture defined by an opening in the hypersonic aircraft to allow the laser beam to be directed against a target. The present invention is particularly applicable to a hypersonic vehicle powered by a supersonic combustion ramjet (SCRJ) engine.

Moreover, pursuant to the teachings of the present invention, electrical energy from the electrical generator is supplied to a plurality of excitation electrodes or grid, positioned along the cavity walls of the laser cavity, to provide an electric field for electronic excitation of the lasing gases flowing through the laser cavity. A separate electrical generator duct is provided in the hypersonic vehicle for providing ram air to the electrical generator, and a door is positioned at the inlet to the duct, and is normally maintained closed except during lasing operations. In some embodiments taught herein, the electrical generator can be driven by ram air and fuel combustion. Moreover, in different alternative embodiments, the electrical generator can be either a turbogenerator, or an electrofluiddynamic generator, or a magnetohydrodynamic generator, or a thermoelectric generator.

One particularly advantageous feature of the present invention is the provision of a laser frequency agility control circuit, coupled between the electrical generator and the excitation electrodes, for controlling the electrical power or voltage supplied to the electrodes and the electric field generated thereby. This in turn controls the voltage, or the kinetic energy, of the electrons introduced into the laser cavity, and thereby the wavelengths of laser radiation produced therein. In different embodiments, the laser frequency agility control means can alter the wavelength of laser radiation produced by hydrogen, nitrogen or oxygen, or other gases.

Another very significant feature of the subject invention is the provision of gas additive injection nozzles or other means positioned near the entrance to the laser cavity to introduce a lasing influencing gas into the airflow through the laser cavity. In particular embodiments, the gas additive means can be coupled to sources of CO, NO, HCl or CS lasing gas to influence lasing operation in the laser cavity.

Other features of the present invention include the provision of a door for the laser cavity inlet which is normally maintained closed except during lasing operations. Moreover, the output aperture can be provided with a movably positioned output laser beam mirror which directionally controls the projected output of the laser beam.

The present invention encompasses several different types of gasdynamic laser systems and operations, which can be categorized in the following classifications and subclassifications.

1. gasdynamic laser operations in which constituents of the atmosphere, such as oxygen and nitrogen are energized to lasing operations. These lasing operations will probably require electronic excitation of the gases, as disclosed and taught herein.

2. gasdynamic laser operations involving diatomic species such as HCl, NO, CO and CS. These lasing operations will probably require the injection of gas additives to influence and alter the lasing operations, but will probably not require electronic excitation as in the first category.

3. gasdynamic laser operations involving hydrogen, either when used as a fuel or not. When hydrogen is used as a fuel, as a consequence of the chemical energy released in combustion electronic excitation will probably not be required, but is probably required when the hydrogen is not used as a fuel.

BRIEF DESCRIPTION OF THE DRAWINGS

The foregoing objects and advantages of the present invention for a hypersonic gasdynamic laser system may be more readily understood by one skilled in the art with reference being made to the following detailed description of several preferred embodiments thereof, taken in conjunction with the accompanying drawings wherein like elements are designated by identical reference numerals throughout the several views, and in which:

FIG. 3 is a side elevational view of a second embodiment of a hypersonic vehicle incorporating therein a hypersonic gasdynamic laser system pursuant to the teachings of the present invention:

FIG. 4 is a rear view of the hypersonic vehicle of FIG. 3, illustrating additional details of the construction of the hypersonic gasdynamic laser system;

FIGS. 5 and 6 are respectively top plan and side elevational views of the second embodiment shown in FIGS. 3 and 4, and illustrate schematically one embodiment of an optical system and train for collecting laser radiation from the laser cavity and collimating and directing the collimated laser from the laser cavity to an output aperture and mirror in the hypersonic vehicle.

DETAILED DESCRIPTION OF THE DRAWINGS

Figure 1:
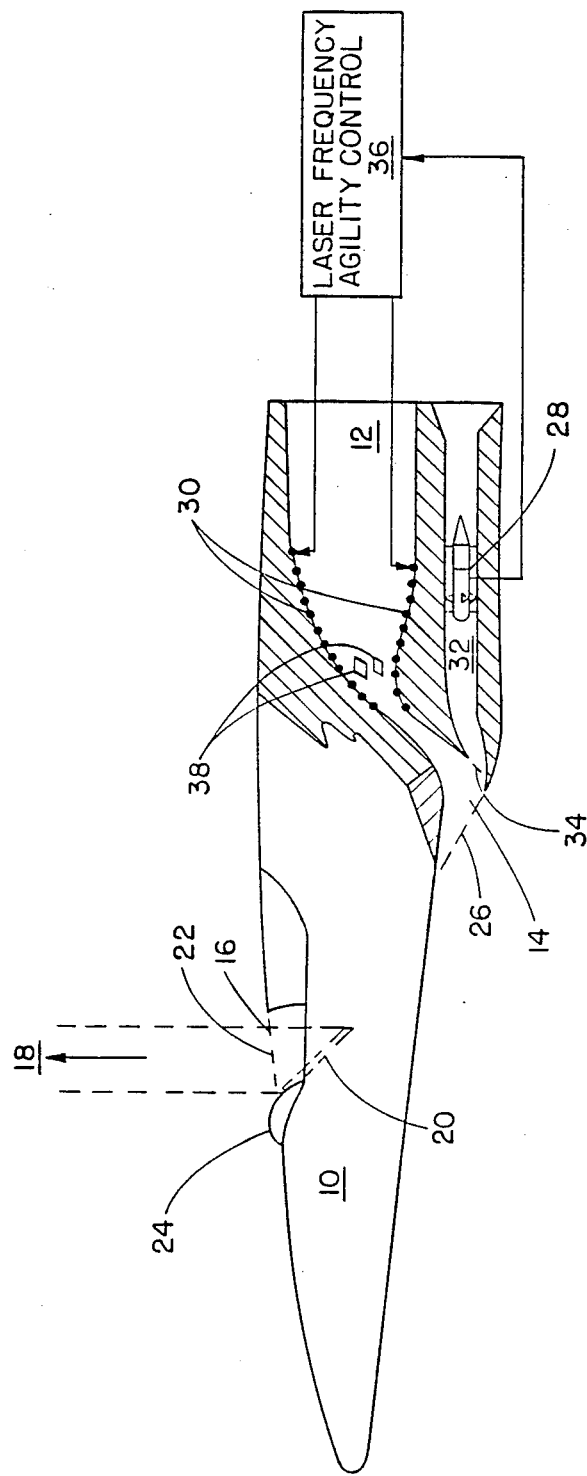
FIG. 1 is a side elevational view, partially in section, of a hypersonic vehicle, illustrating details of the hypersonic gas dynamic laser system incorporated therein.
Figure 2:
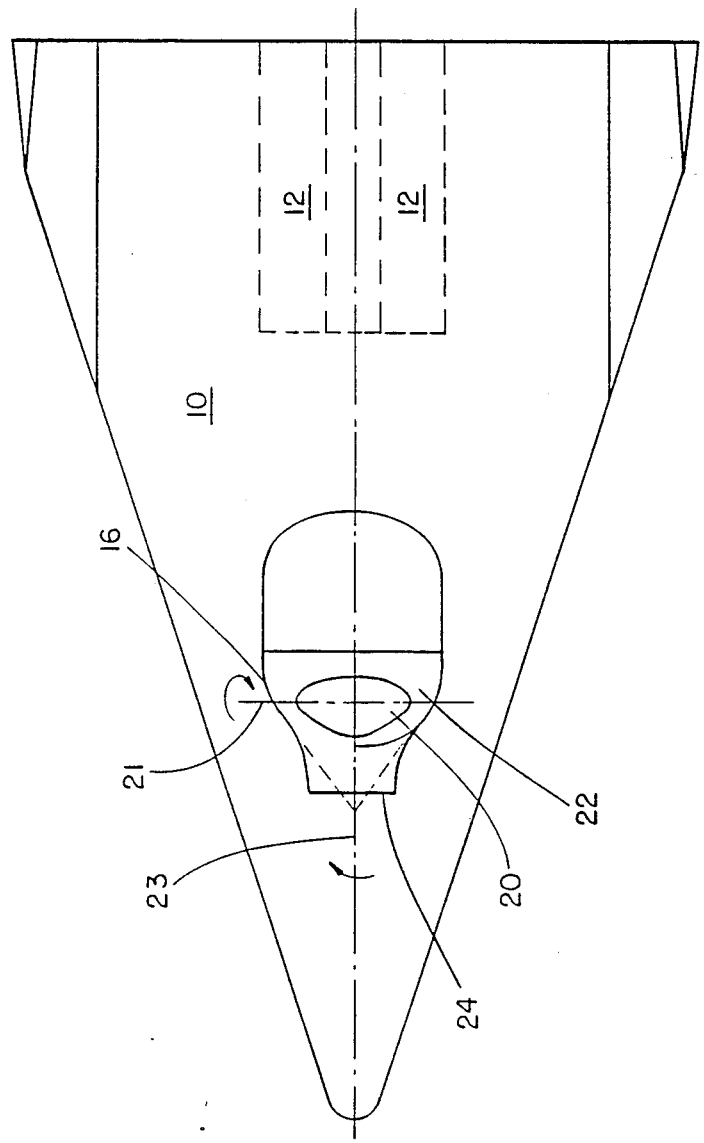
FIG. 2 is a top plan view of the hypersonic vehicle of FIG. 1, illustrating further details of the vehicle and the hypersonic gasdynamic laser system therein.

Referring to the drawings in detail, FIGS. 1 and 2 illustrate respectively a side elevational and top plan view of a first embodiment of a visible, or near to mid infra-red, hypersonic gasdynamic laser system constructed pursuant to the teachings of the present invention. The hypersonic gasdynamic laser system is mounted in a hypersonic vehicle 10, which also provides high enthalpy ram air for gasdynamic excitation of the laser gases. The hypersonic vehicle of this embodiment does not contain a sustaining propulsion device but is accelerated to hypersonic speeds by a separate detachable rocket booster that detaches from the vehicle once an operational altitude and Mach number is attained. The unpowered vehicle then glides at hypersonic speeds to an area of deployment where laser operation is exercised.

A laser cavity 12 is defined within the hypersonic vehicle, and a laser cavity inlet 14 therefore is formed by an opening in the hypersonic vehicle, such that ram air directed through said laser cavity opening supplies and supports gasdynamic lasing operations in the laser cavity 12. An optical train is provided for collecting the laser radiation from the laser cavity and directing it as a substantially collimated beam to an output aperture 16 defined by an opening in the hypersonic aircraft to allow the laser beam 18 to be projected external to the vehicle.

A movably positioned output laser beam mirror 20 is provided at the output aperture and is positionally controlled to directionally control and project the output laser beam. The control system for positioning the output mirror typically might comprise an on-board computer coupled to a navigational guidance system and also receiving target positional information either from on-board sensors (e.g. radar, infrared, etc.) or from information telemetered from a remote control station. The output mirror can be rotationally controlled about two orthogonal axes 21, 23 by conventional positioning control systems, as by an encoder to measure the current angular position of the mirror and a stepping control motor to angularly drive the mirror, typically under control of the on-board computer. The output mirror is preferably covered by a curved window 22 conforming to the exterior shape of the hypersonic vehicle, and the window 22 is preferably slideable to an open position in which the mirror 20 is uncovered, and to a closed position in which the mirror 20 is covered. A boundary layer diverter 24 can also be positioned forwardly of the window 22 to reduce the disturbed flow field of the hypersonic vehicle in the immediate proximity of the window. A movable inlet door 26 is also provided for the laser cavity inlet, and the door 26 is normally maintained closed except during lasing operations to reduce the aerodynamic drag of the vehicle's cavity disturbances.

A very significant feature of the present invention is the provision of an electrical generator, illustrated as a turbogenerator 28, which is mounted in the hypersonic vehicle and is driven by ram air directed therethrough for producing electrical power.

A plurality of excitation electrodes 30 are positioned along the walls of the laser cavity 12 and are supplied with electrical power from the electrical generator 28 for providing an electric field therebetween for the electronic excitation of lasing gases flowing through the laser cavity. A separate electrical generator duct 32 is provided in the hypersonic vehicle for providing ram air to the electrical generator, and a door 34 is positioned at the inlet to the electrical generator duct which is maintained closed except during lasing operations. In some embodiments taught herein, the electrical generator can be driven by ram air and fuel combustion. Additionally, in different embodiments the electrical generator can be either a turbogenerator, or an electrofluiddynamic generator, or a magnetohydrodynamic generator, or a thermoelectric generator.

One particularly advantageous feature of the present invention is the provision of a laser frequency agility control circuit 36, coupled between the electrical generator and the excitation electrodes, for controlling the electrical energy supplied to the electrodes and the electric voltage field set up thereby. This in turn controls the energy of the electrons introduced into the laser cavity, and thereby the wavelength of the laser radiation produced in the laser cavity. The laser frequency agility control circuit is essentially a power control and regulation circuit having the unregulated electrical power from the generator as an input. The power control and regulation circuit applies a selected and regulated voltage and current at the electrodes 30, selected in accordance with the considerations of 7-9. The regulated voltage and current are selected to FIGS. produce a given electron energy content with which to traverse and collide with molecules or atoms of the gases flowing through the laser cavity, which in turn results in particular excitations and corresponding wavelengths of radiation being lased by the gases flowing through the laser cavity. In different embodiments, the laser frequency agility control means can control the wavelength of laser radiation produced by either hydrogen, nitrogen or oxygen, pursuant to the energy level diagrams of FIGS. 7-9.

Figure 7:
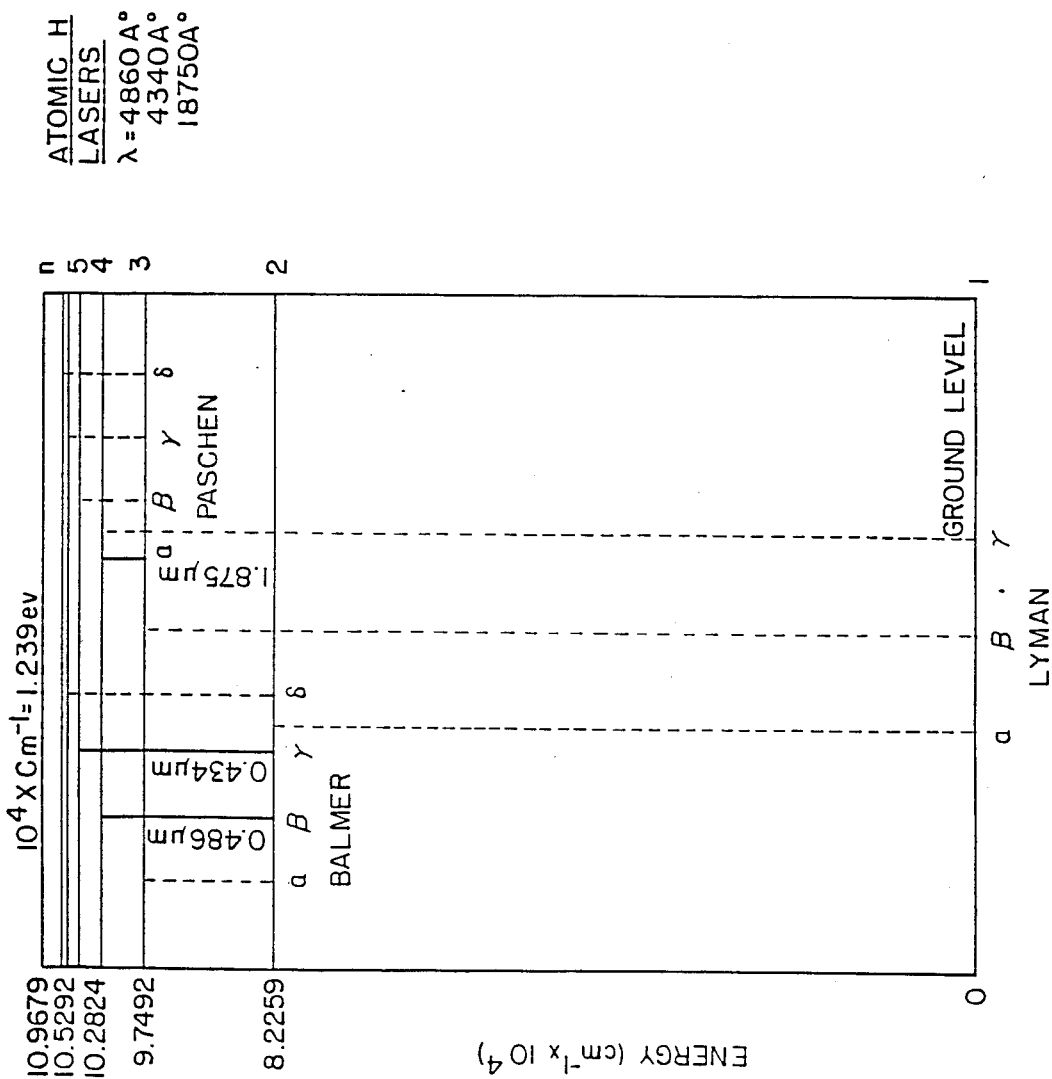
FIG. 7, 8 and 9 illustrate partial energy level diagrams for respectively hydrogen, nitrogen and oxygen showing reported laser transitions therein, which allow the hypersonic gasdynamic laser system of the present invention to be operated with laser frequency agility to select the particular wavelength of radiation at which the system is lasing.

For instructional purposes, FIG. 7 illustrates a schematic diagram of energy excitation levels or states for neutral atomic hydrogen in the gaseous state. The ordinate axis represents the energy state, above the lowest or ground state, for the various excited levels of the atom. A full explanation of the physics and nomenclature underlying this representation may be found in such references as H.E. White's "INTRODUCTION TO ATOMIC SPECTRA", McGraw Hill, N.Y. (1934) and G. Herzberg's "ATOMIC SPECTRA AND ATOMIC STRUCTURE", Dover Publications, N.Y. (1944). The ordinate axis units are wave numbers in $10^4$ cm$^{-1}$. A level of $1 \times 10^4$ cm$^{-1}$ is equivalent to an increment of 1.239 electron volts of energy above ground state. As incidental information, several systems of observed spectral lines are identified i.e., Balmer, Lyman, etc. Laser transitions have been identified only for two Balmer series transitions (at 4340Å and 4860Å) and for the 1.875 μm radiation wavelength in the Paschen series, as indicated in FIG. 7 by arrowed solid lines.

Figure 8:
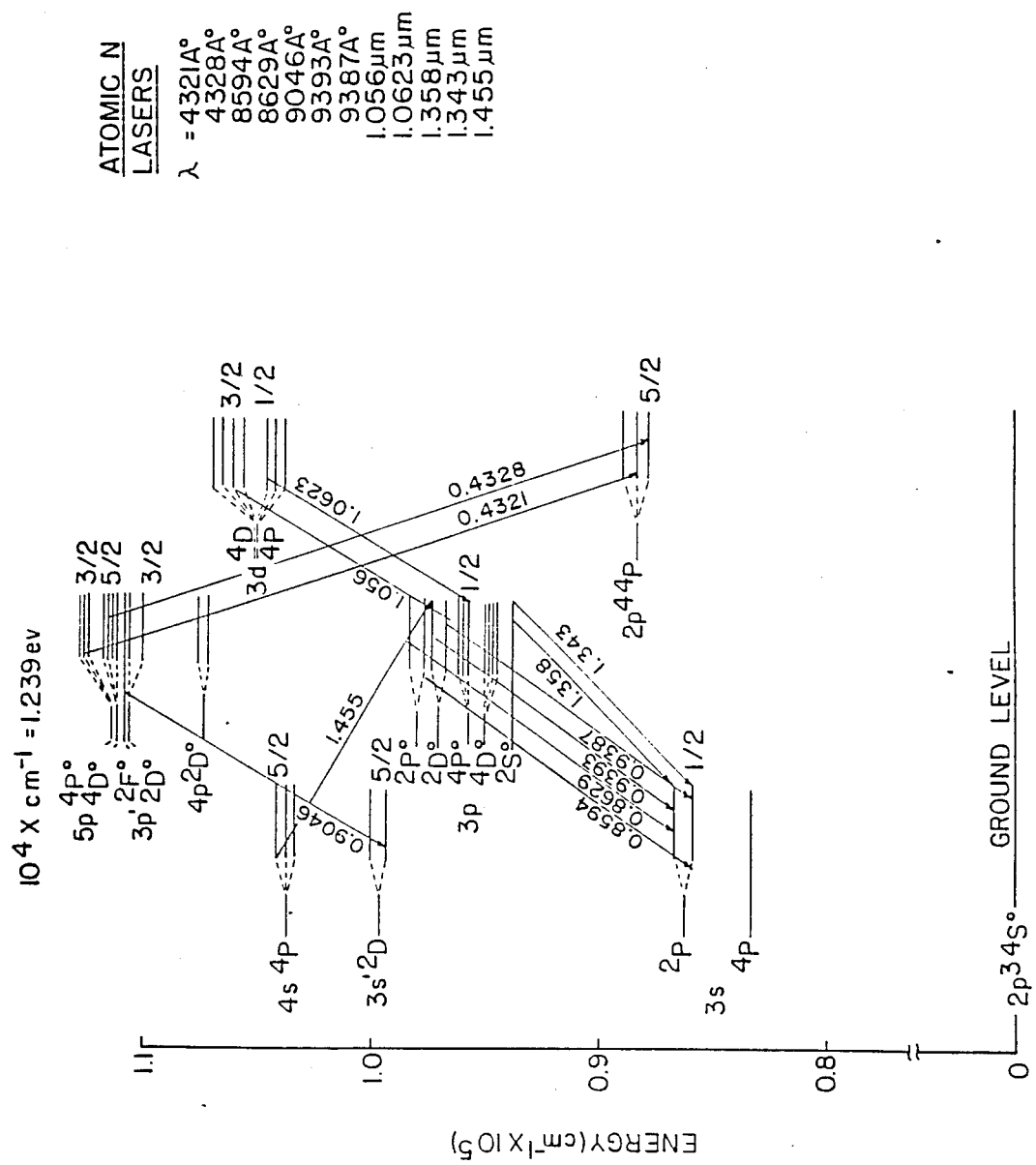
Figure 9:
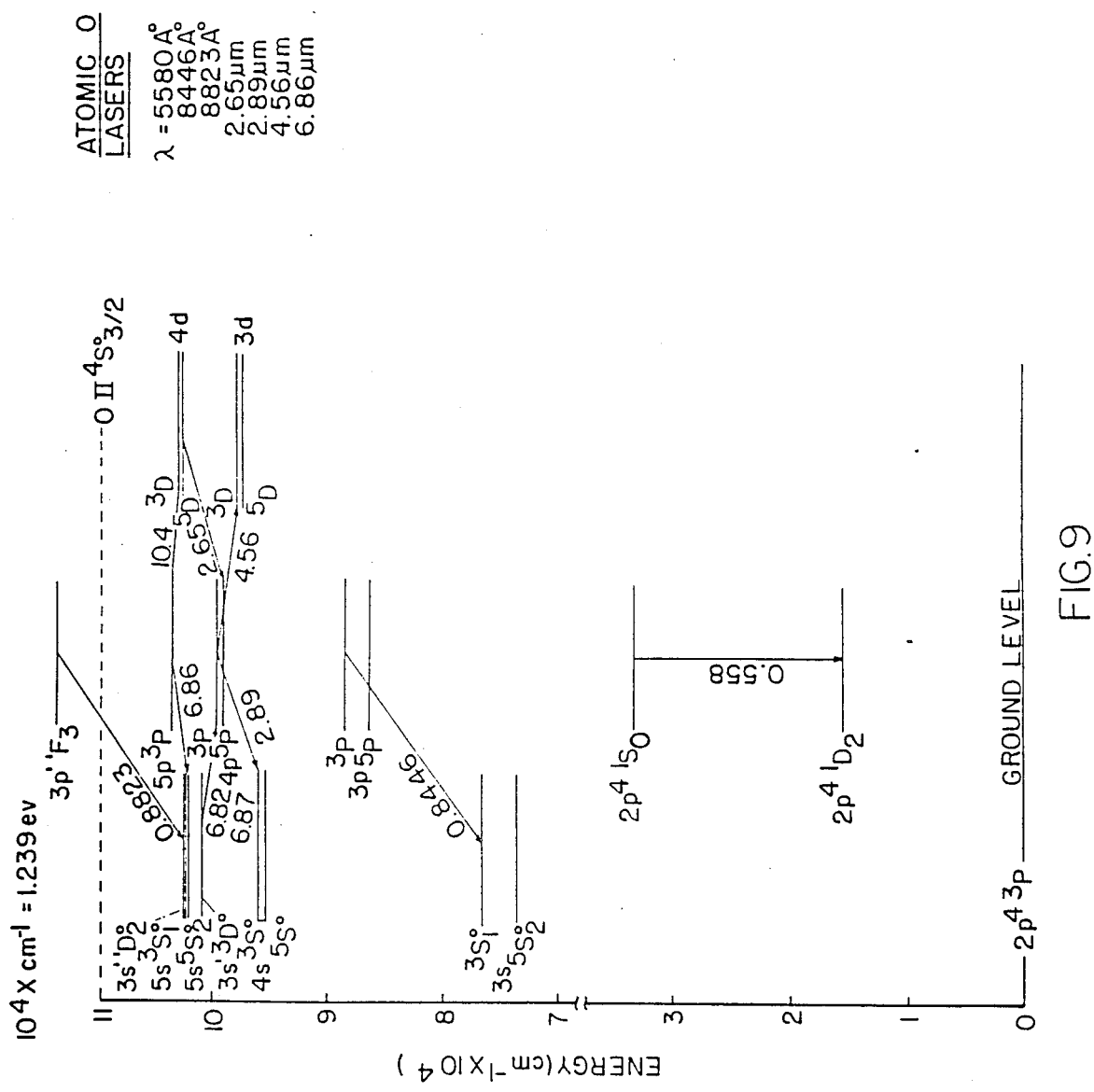

Similarly, FIGS. 8 and 9 present energy level schematic diagrams for atomic nitrogen and atomic oxygen, respectively. For the case of gaseous atomic nitrogen, twelve transitions that produce laser radiation have been documented (see FIG. 8). Each laser transition between 4321Å and 1.455 μm represents a spontaneous drop from a higher energy level to a lower level by a non-equilibrium, large concentration of atoms in the higher state to a non-equilibrium, very low, concentration in the lower state. It should be evident from FIG. 8 that small changes in the excitation levels of the metastable atomic nitrogen can result in laser radiation at many different wavelengths corresponding to each of the changes. Thus, by suitably altering the energy content of the excitation source, a device can be made to display agility in the changing of the wavelength (or frequency) of the laser. For example, referring to FIG. 8, pumping (i.e., excitation) of atomic nitrogen to the $3p^2S°$ spectrally designated state, to create large metastable concentrations, requires 11.595 ev of effective energy per atom of nitrogen. Spontaneous de-excitation to a depleted $3s^2P$ designated doublet state yields lasers with wavelengths of 1.343 and 1.358 μm. If the process of excitation above ground state is increased to an effective energy level of 12.114 or 12.118 ev/atom, the $3p2P°$ doublet levels are produced instead of $3p^2S°$. Spontaneous emission and deexcitation to the $3s^2P$ doublet will yield laser radiation at 8594Å or 8629Å, respectively. While it may be impractical to maintain a small energy difference of 0.004 ev (between 12.114 and 12.118) in an electron beam excitation process, it is within practical implementation to establish a differential of about 0.52 ev (i.e., between 11.595 ev required for the $3p^2S°$ state and the 12.114–12.118 ev required for the $3p2P°$ doublet). Thus, lasers of approximately 1.35 μm wavelength can be changed, with agility, to approximately 8600Å by increasing the effective excitation level through measures to increase the initial excitation level by slightly more than ½ ev. A typical implementation would be to electronically switch resistive circuits to change the accelerating grid voltage of an electron beam excitation source arrangement.

FIG. 9, likewise, shows that at least seven possible laser radiating transitions have been documented for gaseous atomic oxygen transitioning from levels (above ground state) between 4.187 and 14.124 ev (corresponding to wavenumbers of $3.379 \times 10^4$ cm$^{-1}$ and $11.3996 \times 10^4$ cm$^{-1}$ for the $2p^4$ $^1So$ and $3p^1$ $^1F_3$ state designations, respectfully).

Another very significant feature of the subject invention is the provision of a plurality of gas additive injection nozzles 38 positioned near the entrance portion to the laser cavity to inject a lasing influencing gas into the airflow through the laser cavity. In particular embodiments, the gas additive nozzles can be coupled to sources of diatomic gases such as CO, NO, HCL or CS lasing gas to influence lasing operations in the laser cavity.

The following discussion of diatomic gasdynamic laser mechanisms is a brief explanation of this technology. Diatomic gases like CO and NO have fundamental vibrational band radiative transitions corresponding to 4–6 μm wavelengths. Such vibrationally excited molecules can be produced by thermal heating exothermic chemical reactions or electron impact excitations induced by electrical, RF, or microwave discharges.

Demonstrations of CO lasing at λ=4.8 to 5.4 μm have been made in the prior art using $3N_2+CO$ mixtures with Argon in a helium-driven shock tunnel where stagnation temperatures of about 2100° K were produced. The prior art indicated that the CO gasdynamic laser performed as well as or better than the $CO_2$ laser. The excitation mechanism involves $N_2$, and is similar to the $CO_2$ laser in that high-temperature, vibrationally excited $N_2$ is frozen in that state by a rapidly expanded nozzle. The frozen excited states of $N_2$ act as energy reservoirs for the lowest vibrational level of CO which can repeatedly be pumped up, after lasing, to higher vibrational levels without ever passing completely back down to the ground state. However, there is no pure inversion between vibrational states in this laser Rather, there is a population inversion from combined vibration-rotation levels of adjacent vibrational states. Symbolically, such lasing band transitions can be depicted as:

$$(v+1,J-1) \to (v,J)$$

where the "J's" denote rotational quantum number subdivision levels within each "v" vibrational state. Because rotational relaxation is faster than vibrational relaxation, populations of both vibrational states will have distributions in the rotational levels according to their respective rotational temperatures. Population inversions occur between rotational-vibrational levels during lasing.

Combustion-driven CO lasers use chemical reactions between carbon disulfide ($CS_2$) and CS with air-derived oxygen ($O_2$) to populate vibrational-rotational energy levels with non-equilibrium distributions in Mach 2.5 expansions. Laser wavelengths between 4.9 μm and 5.66 μm result from the cascade of transitions, and laser power is predicted at 3 kW with 10 cm diameter optics, and specific energy outputs in excess of 2 kJ/mole have been produced. Strong radiation at 5.3 to 5.7 μm has also been reported as a result of combustion of premixed air and carbon disulfide gases.

Chemical reactions in the hydrogen-fueled airbreathing propulsion system of hypersonic flight vehicles offer another embodiment for a shorter wavelength IR laser. This laser mechanism, at 3.7 μm wavelength, is based on the transfer of vibrational energy of hot $H_2$ to the gas halide HC1 introduced into the supersonic plume entering the laser cavity. Calculations for 3000° K gas mixtures predict 80-120 kJ of laser energy per pound of halide flow through the cavity.

Electrical excitation in supersonic flows of CO mixtures within $N_2$, He, or Ar carrier gases has produced strong CO lasers of the first harmonic overtones at 2.7 and 3.1 μm, as well as at the 5 μm fundamental wavelength band. Although such processes are not pure gasdynamic lasers, they appear to offer symbiotic possibilities if RF or microwave energy radiation sources are available from other primary vehicle subsystem functions such as radar or communications.

Finally, electronic excitations of atomic oxygen, atomic nitrogen, or atomic hydrogen, produced in hypersonic airbreathing propulsion systems can yield laser radiation at approximately 0.85 μm, 0.94-1.46 μm, and 1.88 μm, respectively. High-speed, low static pressure flows of these three candidate species can also be generated by special rocket propellant reactions.

FIGS. 3, 4 and 5 are respectively a side elevational, a rear view and a top plan view of a second embodiment of a hypersonic gasdynamic laser system mounted in a hypersonic vehicle or aircraft 40 defining a central laser cavity 42 therein. FIG. 6 is a side elevational view similar to that of FIG. 3, but illustrating additional details of the optical train, along with the view of FIG. 5 In this embodiment, two SCRJ engines 44, used to sustain vehicle hypersonic airspeed or to extend range, are positioned symmetrically spaced from the sides of the laser cavity 42, and two turbogenerators 46 are positioned symmetrically outside the two SCRJ engines 44.

This second embodiment is designed to operate in the same general manner as the first embodiment with electrical excitation electrodes and gas additive injectors, as required by the particular embodiment, and accordingly the theory of operation thereof will not be repeated with respect to this second embodiment. The second embodiment is also preferably equipped generally with the same types of windows and doors as explained with respect to the first embodiment, which are not illustrated in detail in the second embodiment. The second embodiment can be equipped with trim canards 48, and a boundary layer bleed device 50 positioned forwardly of the output window 52 to improve the uniformity of the flow field external and adjacent to the aircraft vehicle at the window location. This uniformity is desirable to minimize the optical path disturbance of the flow relative to the projected laser beam, in order to enhance laser effectiveness.

FIGS. 5 and 6 are of particular interest, and are respectively top plan and side elevational views of the second embodiment. These Figures illustrate schematically one embodiment of an optical system and train for collecting laser radiation from the laser cavity 42, and collimating and directing the collimated laser from the laser cavity to an output aperture through window 52 in the hypersonic vehicle. Referring to those Figures, a plurality of fixed collecting laser cavity mirrors 54 are positioned around the laser cavity to collect the laser radiation therein and direct the laser radiation onto a second fixed mirror 56. The mirror 56 is positioned outside of the laser cavity and redirects the radiation forwardly through a duct 57 alongside the laser cavity to another fixed mirror 58. The fixed mirror 58 is located alongside and forward of the laser cavity, and is curved to expand the laser radiation and redirect it onto a movable central mirror 60 located forward and above the laser cavity. The central mirror 60 is also curved to expand the laser beam, and redirects it forwardly to a flat movable central mirror 62. The mirror 62 redirects the expanded and substantially collimated laser beam through an output aperture in the vehicle defined therein by an output window 52. In this embodiment, the positionally controlled mirrors 60 and 62 can be mounted in gimbals for positional movement, and are positionally controlled to directionally control the output laser beam. The control system for positioning the mirrors 60 and 62 typically might comprise an on-board computer coupled to a navigational guidance system and also receiving target positional information either from on-board sensors (e.g. radar, infrared, etc.), or from information telemetered from a remote control station. The mirrors 60 and 62 can be rotationally controlled about two orthogonal axes by conventional positioning control systems, as by an encoder to measure the current angular position of each mirror, and a stepping control motor to angularly drive the mirror, typically under control of the on-board computer.

The laser beam can be enclosed by ducts, as for example by duct 57, enclosing the entire optical train through to the output window 52.

As explained hereinabove, FIGS. 7, 8 and 9 illustrate partial energy level diagrams for respectively hydrogen, nitrogen and oxygen showing reported laser transitions therein, which allow the hypersonic gasdynamic laser system of the present invention to be operated with laser frequency agility to select the particular wavelength of radiation at which the system is lasing. In particular, the energy level diagrams illustrate the laser transitions at particular wavelengths at which lasing operations can be expected with particular input excitations of energy.

While several embodiments and variations of the present invention for a hypersonic gasdynamic laser system are described in detail herein, it should be apparent that the disclosure and teachings of the present invention will suggest many alternative designs to those skilled in the art.

What is claimed is:

1. A visible, or near to mid infra-red, hypersonic gasdynamic laser system, comprising:
   a. a hypersonic vehicle for carrying the hypersonic gas dynamic laser system, and also providing high energy ram air for thermodynamic excitation and supply of the laser gas;
   b. a laser cavity defined within said hypersonic vehicle and having a laser cavity inlet for the laser cavity formed by an opening in the hypersonic vehicle, such that ram air directed through said laser cavity opening supports gasdynamic lasing operations at wavelengths less than $10.6\mu$ meters in the laser cavity; and
   c. an optical train for collecting the laser radiation from said laser cavity and directing it as a substantially colimated laser beam to an output aperture defined by an opening in the hypersonic vehicle to allow the laser beam to be directed against a target.

2. A hypersonic gasdynamic laser system as claimed in claim 1, further including:
   a. an electrical generator mounted in said hypersonic vehicle which is driven by ram air directed therethrough for producing electrical power; and
   b. a plurality of electrodes positioned in said laser cavity and supplied with electrical power from said electrical generator for providing for the electrical excitation of the gases flowing through the laser cavity.

3. A hypersonic gasdynamic laser system as claimed in claim 2, further including a separate electrical generator duct in said hypersonic vehicle for providing ram air to said electrical generator.

4. A hypersonic gasdynamic laser system as claimed in claim 3, wherein a door is provided at the inlet to the electrical generator duct which is maintained closed except when a lasing operation is performed.

5. A hypersonic gasdynamic laser system as claimed in claim 2, wherein said electrical generator is driven by ram air and fuel combustion.

6. A hypersonic gasdynamic laser system as claimed in claim 2, wherein said electrical generator is either a turbogenerator, or an electrofluiddynamic generator, or a magnetohydrodynamic generator, or a thermoelectric generator.

7. A hypersonic gasdynamic laser system as claimed in claim 2, further including a plurality of gas injection nozzles positioned near the entrance portion of the laser cavity to inject a lasing influencing gas into the airflow through the laser cavity.

8. A hypersonic gasdynamic laser system as claimed in claim 2, wherein said hypersonic vehicle is powered by a supersonic combustion ramjet engine.

9. A hypersonic gasdynamic laser system as claimed in claim 2, including a laser frequency agility control means, coupled between said electrical generator and said plurality of electrodes, for controlling the electrical power and voltage supplied to said plurality of electrodes for controlling the energy of electrons introduced into said laser cavity gas to control the wavelengths of the laser radiation produced in said laser cavity.

10. A hypersonic gasdynamic laser system as claimed in claim 9, wherein said laser frequency agility control means controls the wavelength of laser radiation produced by hydrogen, nitrogen or oxygen.

11. A hypersonic gasdynamic laser system as claimed in claim 1, further including a plurality of gas additive injection nozzles positioned near the entrance portion of the laser cavity to inject a lasing influencing gas into the airflow through the laser cavity.

12. A hypersonic gasdynamic laser system as claimed in claim 11, wherein said gas additive nozzles are coupled to a source of CO, NO, HCL or CS lasing gas to influence lasing operation in the laser cavity.

13. A hypersonic gasdynamic laser system as claimed in claim 11, further including:
   a. an electrical generator mounted in said hypersonic vehicle which is driven by ram air directed therethrough for producing electrical power; and
   b. a plurality of electrodes positioned in said laser cavity and supplied with electrical power from said electrical generator for providing for the electronic excitation of gases flowing through the laser cavity.

14. A hypersonic gasdynamic laser system as claimed in claim 11, including a laser agility control means, coupled between said electrical generator and said plurality of electrodes, for controlling the electrical power and voltage supplied to said plurality of electrodes for controlling the energy of electrons introduced into said laser cavity to control the wavelength of the laser radiation produced in said laser cavity.

15. A hypersonic gasdynamic laser system as claimed in claim 1, wherein a door is provided for the laser cavity inlet which is maintained closed except during a lasing operation.

16. A hypersonic gasdynamic laser system as claimed in claim 1, including a movably positioned output laser beam mirror, and means for directionally controlling the position of said mirror to aim and project the output laser beam.

* * * * *

UNITED STATES PATENT AND TRADEMARK OFFICE
CERTIFICATE OF CORRECTION

PATENT NO. : 4,928,286

DATED : May 22, 1990

INVENTOR(S) : Kenneth M. Foreman, et al.

It is certified that error appears in the above-identified patent and that said Letters Patent is hereby corrected as shown below:

Column 5, line 38: "7-9" should read as --FIGS. 7-9--;

Column 5, line 40: "to FIGS. produce" should read as --to produce--;

Signed and Sealed this

Twenty-seventh Day of August, 1991

Attest:

HARRY F. MANBECK, JR.

*Attesting Officer*   *Commissioner of Patents and Trademarks*